T. HORSMAN.
BELT CUTTING MACHINE.
APPLICATION FILED OCT. 23, 1915.
1,254,806.
Patented Jan. 29, 1918.
2 SHEETS—SHEET 1.
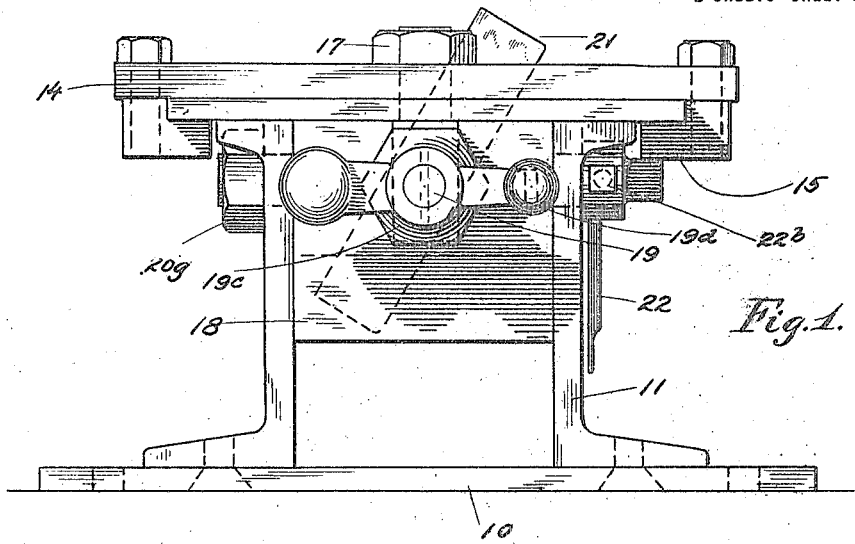
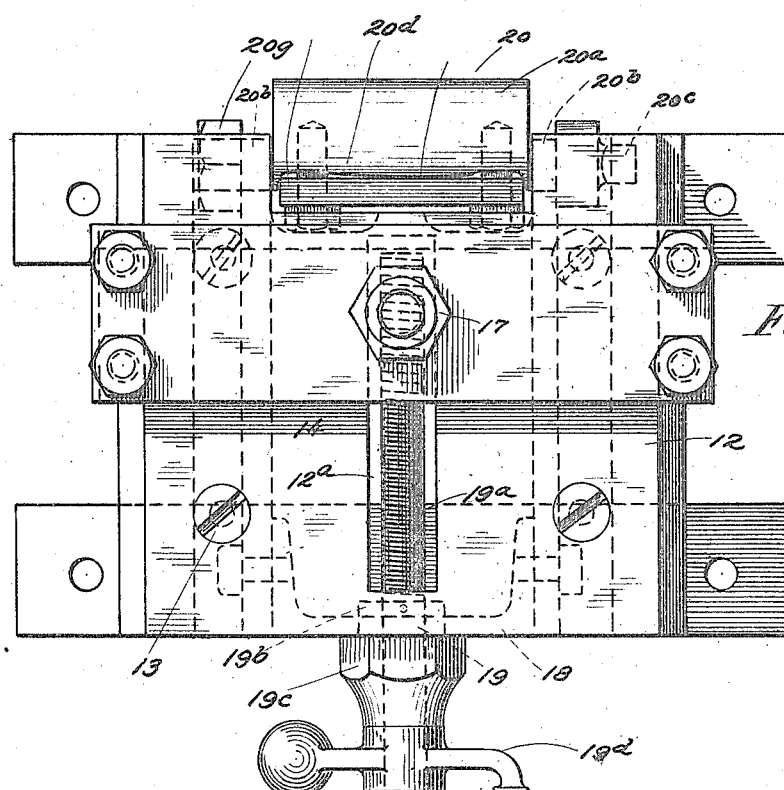
Witness:
CC Dunap
Inventor:
Thomas Horsman
By Sheridan, Wilkinson & Scott, Attys

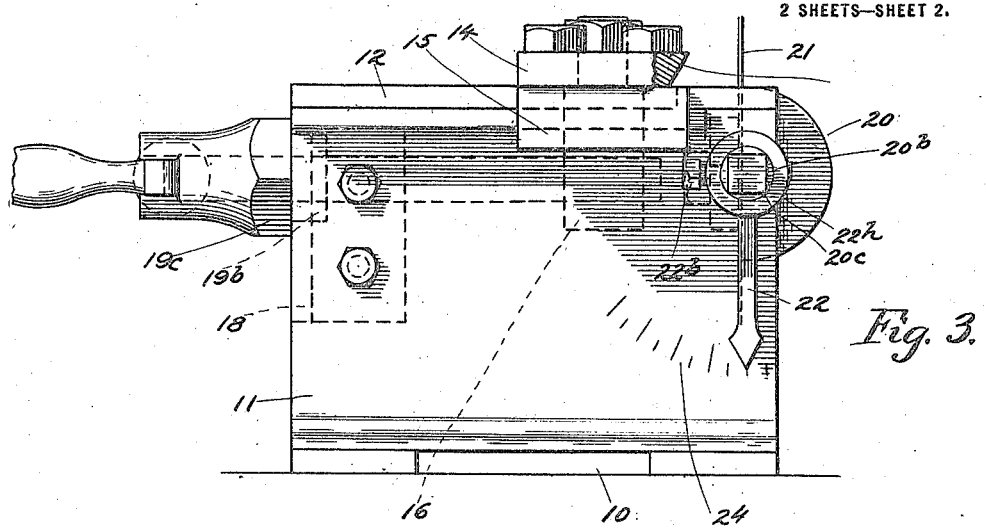
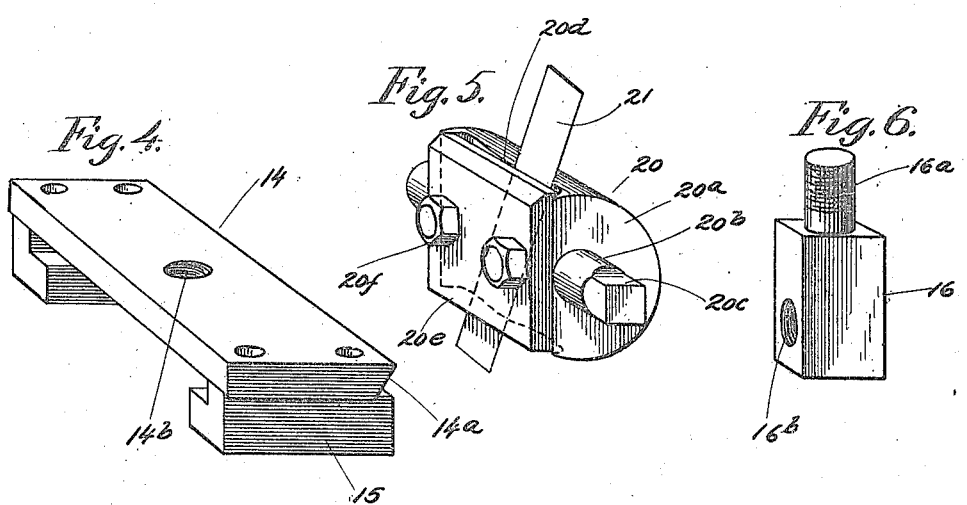
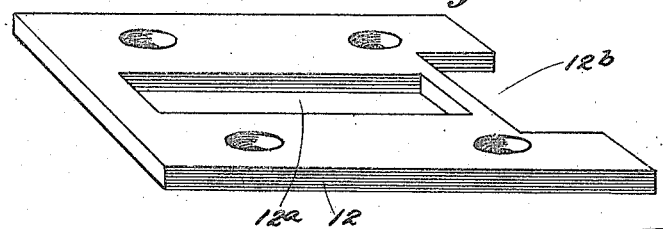

UNITED STATES PATENT OFFICE.

THOMAS HORSMAN, OF CHICAGO, ILLINOIS, ASSIGNOR TO CHICAGO BELTING COMPANY, A CORPORATION OF ILLINOIS.

BELT-CUTTING MACHINE.

1,254,806.

Specification of Letters Patent.

Patented Jan. 29, 1918.

Application filed October 23, 1915. Serial No. 57,439.

*To all whom it may concern:*

Be it known that I, THOMAS HORSMAN, a citizen of the United States, residing at Chicago, in the county of Cook and State of Illinois, have invented certain new and useful Improvements in Belt-Cutting Machines, of which the following is a specification.

This invention relates to improvements in belt cutting machines, or the like, which may be utilized to cut belts or strips of leather, or similar material, having inclined sides of any desired angularity.

Hitherto in constructing and cutting V-belts and similar devices it has been customary to provide a pair of inclined cutter blades whose angularity it was necessary to adjust individually, being a laborious task and one requiring considerable care. In this type of cutting machine considerable waste ensues, since in the cutting of each belt or strip a V-shaped strip is wasted, as will be obvious. In my improved machine I perform the cutting with a single cutter. The angularity may be readily adjusted, and I eliminate practically all the waste formerly resulting, as will be more fully explained below.

Another object of my invention is to provide a machine of the class described, in which is provided a cutter carrying means capable of adjustment relative to the plane of the belt or strip from which the same is being cut, and so constructed that the cutter carried thereby may be adjusted to vary its angularity relative to the cutter carrying means.

Still another object resides in the provision of a machine of the class described and its specific construction is described in the following specification and shown in the accompanying drawings, in which—

Figure 1 is an end elevation of my machine;

Fig. 2 is a plan view of the same;

Fig. 3 is a side elevation of the same;

Fig. 4 is a perspective of the guide member;

Fig. 5 is a perspective of the cutter carrying member;

Fig. 6 is a perspective of the guide block; and

Fig. 7 is a perspective of the table.

Like numerals refer to like elements throughout the drawings, in which 10 indicates a suitable base or foundation for my machine which comprises up-right supporting walls or members 11 secured by bolts, or the like to the base 10. Secured to the supports 11 at their upper portions and supported thereby is the table 12, shown in perspective in Fig. 7, and which is secured by suitable machine screws 13, or the like, to such supports 11. The table is provided with a long slot or aperture 12$^a$ and a notch or recess 12$^b$ at one end thereof. Slidably mounted upon the table 12 is the guide member 14 having attached to its outer extremities the brackets or lugs 15 which underlie the sides of the table 12, as shown in Fig. 1, for example. The guide member 14 is provided with the inclined bearing side or surface 14$^a$ of any desired angularity, preferably one approximating that to which the belts are to be cut. The guide member or plate 14 is further centrally apertured and threaded, as indicated by numeral 14$^b$, see Fig. 4, and threadably secured therein is the threaded stem 16$^a$ of guide block 16 which projects through the slot 12$^a$ in table 12, and is transversely apertured and threaded, as indicated by numeral 16$^b$. A nut 17 is threaded on the stem 16$^a$ on top of the table 14, serving to clamp the guide block 16 to the plate 14. A cross plate or rib 18 extends across between the supporting members 11, at the rear of the device, the same being centrally apertured to permit the passage therethrough of the rod 19 which is threaded along a portion of its length, as indicated by numeral 19$^a$, which threaded portion engages the threaded aperture 16$^b$ of the guide block 16, see Fig. 2. A collar 19$^b$ is attached to the rod 19 on one side of the plate 18 and a second collar or sleeve 19$^c$ is mounted on the rod 19 on the other side of the plate 18. Outwardly of the collar 19$^c$ and attached to the rod 19 is the operating handle 19$^d$, rotation of which will be apparent and will result in reciprocation of the guide plate 14 along the table 12. I provide a cutter carrying member, generally indicated by numeral 20, which consists of a bearing member 20$^a$ having the trunnioned ends 20$^b$, one of which is squared at 20$^c$ for engagement by a wrench or operating tool. The bearing member 20$^a$ is provided with the convex bearing surface 20$^d$ against which may be clamped cutter blade 21 by the clamping plate 20$^e$, which is secured to the bearing member 20ª by the bolts 20ᶠ. The trunnions 20ᵇ are rotatably mounted in suitable apertures in the supporting members 11, so that the cutter carrying member 20 will lie in the notch 12ᵇ of the table 12. A nut 20ˢ is threaded on one of the trunnions 20ᵇ for clamping the carrying member 20 in adjusted position, as shown in Fig. 2. An indicator 22, having a collar 22ª is secured upon one of the trunnions 20ᵇ by set screw 22ᵇ, this indicator 22 coacting with suitable indices 24 on the face of one of the supports 11 to indicate the amount of angularity of the cutter 21.

In the operation of my machine the angularity of the belt to be cut having been decided upon, the cutter carrying member 20 is adjusted accordingly and the guide plate 14 is also adjusted to determine the necessary width of the belt. The sheet of leather, etc., from which the belt strips are to be cut, is then drawn through between the cutter 21 and guide-plate 14, the first strip cut being formed with one square side and one inclined side, the square side being then drawn through against the cutter to trim it to the desired angle. The sheet of leather, or the like, is then inverted and drawn through to provide the second belt strip, during which drawing, the one side having previously been cut to the desired angle resting against the bearing surface 14ª of guide plate 14. By inverting the sheet this way previous to each cutting operation the belt will be formed with the correctly inclined sides, as is obvious. Certain grades of material require slightly different setting of the cutter blade 21 which may be adjusted relative to the convex bearing surface 20ᵈ to vary its angularity with respect to the axis of the cutter carrying member, so that the plane of the cutter plate 21 may lie parallel with the longitudinal axis of the guide plate 14, or be inclined in either direction with respect thereto according to the conditions met with in use.

It will be obvious that by the use of my device the single blade is all that is required and its adjustment is simple and easy.

It will also be obvious that my device is susceptible of many modifications and improvements and I do not wish to be restricted to the form shown or described beyond the scope of the appended claims.

What I claim is:

1. In a device of the class described, a table, a guide member carried thereby, a cutter carrying member adjustably mounted with respect to said table and guide member, a cutter carried thereby, and means to adjust said cutter carrying member relative to said table and guide to vary the angle of cut, said cutter carrying member being constructed and arranged to permit adjustment of said cutter relative thereto in a plane substantially perpendicular to the plane of movement of material to be cut.

2. In a device of the class described, a table including work guiding means, cutter carrying means mounted with respect to said table and angularly adjustable in a plane at right angles to said guiding means to vary the angle of cut, said means including a convex surface, and cutter fastening means associated therewith whereby said cutter may be angularly adjusted in a plane at right angles to said first mentioned plane.

In testimony whereof, I have subscribed my name.

THOMAS HORSMAN.

Witnesses:
CHAS. A. BALL,
B. T. LEUGARDER.